(12) United States Patent
Schmitz et al.

(10) Patent No.: US 7,730,813 B2
(45) Date of Patent: Jun. 8, 2010

(54) VARIABLE TUNED HOLDER FOR MACHINE TOOLS

(75) Inventors: Tony L. Schmitz, Gainesville, FL (US);
Lonnie A. Houck, III, Stuart, FL (US);
Brian P. Mann, Columbia, MO (US);
Kevin S. Smith, Huntersville, NC (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 705 days.

(21) Appl. No.: 11/571,788

(22) PCT Filed: Jul. 8, 2005

(86) PCT No.: PCT/US2005/024467

§ 371 (c)(1),
(2), (4) Date: Jan. 8, 2007

(87) PCT Pub. No.: WO2006/010093

PCT Pub. Date: Jan. 26, 2006

(65) Prior Publication Data

US 2008/0298912 A1    Dec. 4, 2008

Related U.S. Application Data

(60) Provisional application No. 60/586,420, filed on Jul. 8, 2004.

(51) Int. Cl.
*B23Q 11/00* (2006.01)
*F16F 7/108* (2006.01)

(52) U.S. Cl. .................................... 82/1.11; 82/163

(58) Field of Classification Search .................. 82/1.11, 82/163, 904; 409/141
See application file for complete search history.

(56) References Cited

U.S. PATENT DOCUMENTS 3,690,414 A * 9/1972 Aggarwal et al. ............ 188/378
3,774,730 A   11/1973 Maddux
3,999,632 A * 12/1976 Armbrust et al. ............ 188/380

(Continued)

FOREIGN PATENT DOCUMENTS

DE    198 25 373 A1    12/1999

(Continued)

*Primary Examiner*—Will Fridie, Jr.
(74) *Attorney, Agent, or Firm*—Alston & Bird LLP

(57) ABSTRACT

A variable tuned holder for machine tools that attaches to a machine tool to act in a manner similar to a dynamic absorber while the machine tool is used during machining. The natural frequency of the holder may be matched to the natural frequency of the machine tool as the tool is in use to reduce the amplitude of vibration at the cutting end of tool with a workpiece. The present invention is designed to provide an impedance match between the machine tool and the holder such that the cutting energy may escape and/or be dissipated. The flexible holder may be used as one part of an overall system. The system may be designed to be used with tools of different shapes and/or lengths. As the shape and/or length of the machine tool changes, the system may be easily modified to change the natural frequency of the flexible holder to enable the dynamic absorber effect of the flexible holder to occur. The flexible holder may be included in a kit that may be used with a wide range of lengths and/or shapes of machine tools.

25 Claims, 3 Drawing Sheets

U.S. PATENT DOCUMENTS

| | | | |
|---|---|---|---|
| 4,050,665 A | * | 9/1977 | Matthews et al. ........... 248/638 |
| 4,420,371 A | | 12/1983 | Dahl et al. |
| 4,706,788 A | * | 11/1987 | Inman et al. ................ 188/378 |
| 5,156,503 A | | 10/1992 | Tsujimura et al. |
| 5,170,103 A | | 12/1992 | Rouch et al. |
| 5,957,016 A | | 9/1999 | Segalman et al. |
| 6,062,778 A | | 5/2000 | Szuba et al. |
| 6,719,503 B1 | * | 4/2004 | McCalmont et al. ........ 409/141 |

FOREIGN PATENT DOCUMENTS

DE  102 29 134 A1  1/2004

* cited by examiner

VARIABLE TUNED HOLDER FOR MACHINE TOOLS

CROSS-REFERENCE TO RELATED APPLICATIONS

This application is the national stage entry of International Application No. PCT/US2005/024467, filed Jul. 8, 2005, which claims priority to U.S. Provisional Application No. 60/586,420, filed Jul. 8, 2004.

STATEMENT REGARDING FEDERALLY SPONSORED RESEARCH OR DEVELOPMENT

This invention was made with United States government support under grant number DMI-0238019 awarded by the National Science Foundation and grant number N00014-03-1-0582 awarded by the Office of Naval Research. The United States government has rights in the invention.

FIELD OF THE INVENTION

The present invention relates generally to the field of machine tools. More specifically, the present invention relates generally to methods of and apparatus for suppressing and/or preventing chatter in a machine tool assembly.

BACKGROUND

During a metal cutting operation, any vibratory motion between a cutting tool and workpiece may lead to non-beneficial cutting performances. Furthermore, such vibration may cause the cutting tool or the machine tool to become damaged. Excessive self-excited vibrations, frequently called "chatter," between the cutting element of a machine tool and the surface of the workpiece cause poor surface finish, tool breakage and other unwanted effects that plague machining operations. Such vibrations arise especially when the tool includes a long unsupported length that will permit deflection of the tool. When chatter does occur the machining parameters must be changed and, as a result, productivity may be adversely affected.

When using the stiffest and most advanced machine tool design, there still remains vibration in the machine tool. For example, a long cantilevered boring bar with a single cutting element at its free end will, by its interaction with the workpiece, tend to vibrate. This vibration may be considered to be self-excited because it is generated by the interaction of the cutting element and the workpiece. Such self-excited vibration occurs at frequencies near the natural frequency of the cantilevered tool and tends to increase in amplitude under small disturbing forces.

One such example of a tool that may encounter issues due to excessive vibration is boring bars. Boring bars are used to fabricate deep holes. A primary difficulty in their use is that, because the holes tend to be deep and narrow, the boring bars must be long and have small diameters. Therefore, during machining, the variable cutting force causes the tool to deflect and leave a wavy surface behind. When the cutting edge encounters this wavy surface in the next revolution, additional forces and deflections may be caused which may lead to chatter or unstable machining. The results of chatter are poor surface finish and hole accuracy, large forces and deflections, and potential damage to the tool, workpiece, and/or machining center.

To reduce these vibrations, various methods have been employed. In one example, the metal removal rate may be decreased. However, this approach interferes with production and only minimally reduces the amount of vibration.

Attempts to eliminate the vibration in the boring bar may also include using a boring bar fabricated from solid carbide. However, solid carbide is extremely expensive. Furthermore, solid carbide is fairly brittle and a minor impact upon the boring bar during use or setup may inadvertently damage the bar.

A further attempt to reduce vibration in boring bars includes mounting upon or within the bar a dynamic vibration absorber, such as that absorber disclosed in U.S. Pat. No. 3,774,730, which is comprised of a cylindrical mass of a high density material supported on rubber bushings. When optimally tuned, the mass oscillates in response to vibration produced in the boring bar to cancel out vibration. The absorber may be tuned to accommodate the boring bar for the speed at which the workpiece or boring bar is rotating, the length of the boring bar and the type of machine tool connected at the end of the bar. Such an adjustment is made by longitudinally urging pressure plates at opposing ends of the cylindrical mass thereby compressing the rubber bushings against the mass which simultaneously shifts the position of the mass and alters the stiffness of the rubber bushings to change the dynamics of the cylindrical mass.

However, even with such a design available, each time the boring bar is to be used under different conditions, it must be tuned using sophisticated equipment that may or may not be available on the shop floor. Additionally, in many instances of using dynamic absorbers with boring bars, the boring bars are hollowed and a spring-mass-damper system is added inside the boring bar structure. This places limits on the boring bar diameter, which must be large enough to contain the dynamic absorber, and increases the boring bar cost.

Accordingly, it would be beneficial to provide a holder system for tools that is capable of reducing chatter and/or unstable machining without the need for complex instrumentation. It would also be beneficial to provide a holder system for tools that is capable of reducing chatter and/or unstable machining that may be used without modifying the structure of the tool. It would also be beneficial to provide a holder system for tools that is capable of reducing chatter and/or unstable machining that may be used with existing tools.

SUMMARY

The present invention provides a flexible holder with dynamics tuned to match tool dynamics to help reduce the problems of chatter and/or vibrations during use of the tool. The flexible holder attaches to a machine tool and acts in a manner similar to a dynamic absorber while the machine tool is used during machining. The flexible holder is selected and/or modified such that the natural frequency of the holder is matched to the natural frequency of the tool as it is being used, thereby reducing the amplitude of vibration at the cutting end of the tool and the workpiece. The flexible holder may be included as part of a kit or package that may be used with tools of different shapes and/or lengths. As the shape and/or length of the tool changes, the system may be easily modified to change the natural frequency of the flexible holder.

In particular, in one aspect, the present invention provides an apparatus for reducing vibrations in a machine tool having a holder base, and a flexible holder connected to the base and capable of being connected to a machine tool, wherein the flexible holder is connected to the base such that the flexible holder may move relative to the base, further wherein the flexible holder is connected to the base such that the movement of the flexible holder relative to the base occurs at a natural frequency.

In another aspect, the present invention provides a method for reducing vibrations in a machine tool, the method including the steps of attaching a holder base to the machine tool, connecting a flexible holder to the holder base such that the flexible holder may move relative to the holder base, connecting a machine tool to the flexible holder, and selecting the flexible holder such that as the flexible holder moves relative to the holder base, the movement occurring at a natural frequency.

In another aspect, the present invention provides a kit for reducing vibrations in a machine tool including a holder base, a flexible holder connected to the base, and a means for adjusting a natural frequency of the flexible holder, wherein the flexible holder is connected to the holder base such that the flexible holder may move relative to the holder base.

BRIEF DESCRIPTION OF THE DRAWINGS

Other objects, features and advantages of the present invention will become apparent upon reading the following detailed description, while referring to the attached drawings, in which.

DETAILED DESCRIPTION

Figure 1:
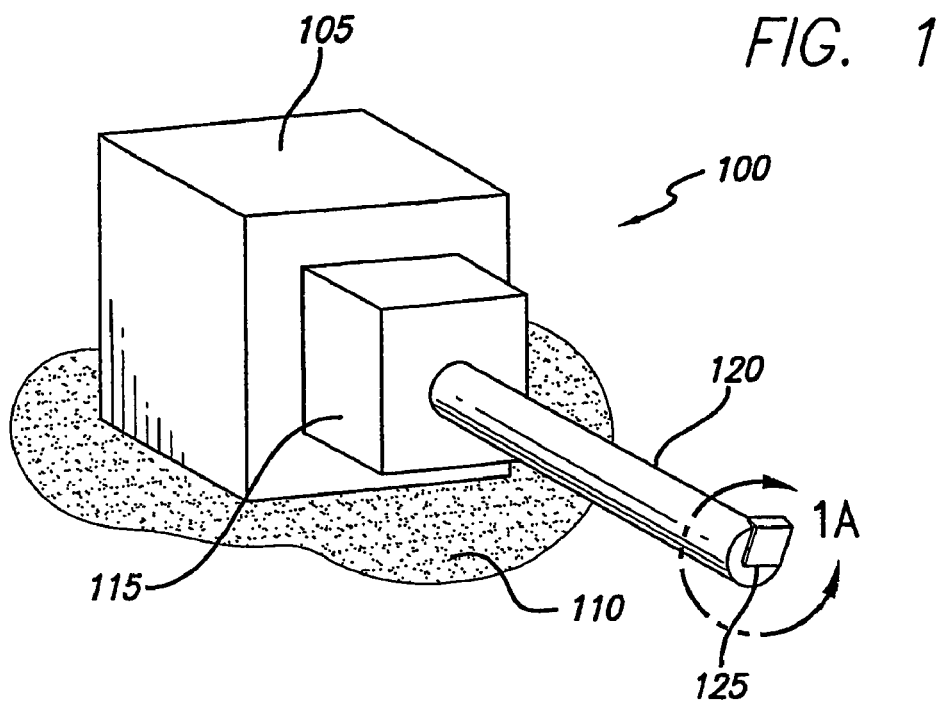
FIG. 1 provides a perspective view of the system of the present invention for one embodiment.

The present invention provides a flexible holder that attaches to a machine tool and holds a machine tool, such as a cutting tool. The flexible holder is constructed and arranged to act in a manner similar to a dynamic absorber while the machine tool is used during machining. Depending on the type of machine tool used, the holder may be used in conjunction with a variety of different machine operations, such as cutting, milling, boring or the like. The natural frequency of the holder may be matched to the natural frequency of the machine tool in use to reduce the amplitude of vibration at the end of the tool, thereby reducing and/or eliminating chatter and/or unstable machining. The present invention is designed to provide an impedance match between the tool and the holder. As used herein, an "impedance match" occurs through the connection of additional impedance to an existing one to accomplish the effect of balancing the overall system. Since impedance is a function of frequency, and since the machine tool operates at a given frequency, the systems of the present invention provide a flexible holder that is capable of changing its impedance such that it matches the impedance of the machine tool in use. The result of the impedance match is that the vibration waves do not get reflected back to the tool during use, which would generate chatter. Rather, the impedance match results in the vibration energy having a path to escape from the tool.

The flexible holder may be used in a system including the holder, means for adjusting the natural frequency of the holder, and/or the machine tool that is connected to the flexible holder. As used herein, the "natural frequency" of the holder is the frequency of the vibrations of the holder when the holder is used in a particular machining operation with a particular tool. Therefore, for a given machine tool and machining operation, the natural frequency of the holder will be set. However, the systems and methods of the present invention adjust the natural frequency to produce the impedance match, thereby reducing and/or eliminating chatter when the machine tool is used. Accordingly, the systems and methods of the present invention may be designed to be used with machine tools of different shapes and/or lengths. As the shape and/or length of the tool changes, the system may be easily modified to change the natural frequency of the flexible holder to enable the dynamic absorber effect of the flexible holder to occur. The flexible holder may be included in a kit that may be used with a wide range of lengths and/or shapes of machine tools.

It is counterintuitive that the use of a flexible tool holder may lead to increased holder-tool assembly dynamic stiffness. Traditional thinking would lead to a choice of a holder that is as stiff as possible. However, the flexible holder of the present invention shows that the interaction between a flexible holder and tool dynamics may lead to reduced amplitude of vibration. This reduced amplitude of vibration may be referred to herein as a "dynamic absorber effect." Dynamic absorbers have been used historically on mechanical structures to reduce the vibration amplitude at a particular driving frequency. For example, if a rotating system, such as the fan of an air conditioner, exhibits a resonance near the rotating frequency, large vibrations in the fan structure may be induced. To reduce these vibrations, a separate spring-mass-damper system, with its natural (or resonant) frequency tuned to the rotating frequency of the air conditioner, may be added to the air conditioner structure. This effectively reduces the amplitude of the air conditioner structure vibration when operating at this frequency by transferring the energy to the added spring-mass-damper system. Nevertheless, for the reasons previously set forth, the use of dynamic absorbers presents one or more problems, such as the use of complex instrumentation and/or modification of the tool.

In use, machine tools perform machining operations, such as cutting or boring, by movement of the tool against the workpiece to be machined. This movement results in vibrations. These vibrations occur at a frequency. This frequency may be based on one or more factors including, but not limited to, the type of machining operation, the type of machine tool, the size of the machine tool, the composition of the machine tool, the size of the workpiece, the composition of the workpiece, the degree of accuracy selected for the machining operation, or a combination thereof. The flexible tool holder, therefore, is modified as needed to match this frequency. In one embodiment of the present invention, the natural frequency of the flexible holder is adjusted such that it matches the natural frequency of the machine tool. In alternative embodiments, the natural frequency of the flexible holder is adjusted such that it is substantially similar to the natural frequency of the machine tool. In one embodiment, the difference between the natural frequency of the flexible holder and the natural frequency of the machine tool is from about less than about 20%. In an alternative embodiment, the difference between the natural frequency of the flexible holder and the natural frequency of the machine tool is from about less than about 10%. In still another embodiment, the difference between the natural frequency of the flexible holder and the natural frequency of the machine tool is from about less than about 5%. In yet another embodiment, the difference between the natural frequency of the flexible holder and the natural frequency of the machine tool is from about less than about 2%.

The flexible holder of the present invention is fundamentally different from dynamic absorbers. The flexible holder clamps the boring bar or other machine tool in place during machining and acts in a manner similar to a dynamic absorber without the need for any internal modification of the tool or other complex instrumentation. The natural frequency of the flexible holder may be matched to the natural frequency of the clamped tool to reduce the amplitude of vibration at the free (cutting) end of the tool. Effectively, the flexible holder of the present invention provides an impedance match between the tool and holder such that the cutting energy is free to escape from the cutting edge and/or may be dissipated through the machine structure. The advantage of the present invention is that there is no "active" control required (i.e., no extra instrumentation or electronics required for the device function), it may use existing tools from the current product lines, and, in contrast to those embodiments wherein the tool is a boring bar or other similar tool that has been hollowed out to contain a dynamic absorber, there are no limitations on the boring bar diameter, such as for boring bars with internal dynamic absorbers where there is a lower limit on the boring bar diameter to allow the absorber to fit inside.

The combination of the overall stiffness of the flexible elements and mass of the holder gives a particular natural frequency of vibration. Accordingly, rather than adding a separate mass and associated flexible support inside the boring bar or other machine tool, the natural frequency of the holder is matched to the natural frequency of the machine tool.

The natural frequency of a machine tool is dependent on its length. If the length is changed, the natural frequency of the holder must also be changed. As such, the present invention contemplates two distinct manners in which to accomplish the present invention: 1) alter the stiffness of the flexible elements; and/or 2) change the mass of the holder. Natural frequency, $f_n$ (in Hz), is related to the stiffness, k, and mass, m, according to Equation 1.

$$f_n = \frac{1}{2\pi}\sqrt{\frac{k}{m}} \quad (1)$$

Accordingly, in one embodiment of the present invention, it is possible to alter the stiffness of the flexible elements used to connect the flexible holder to the base and/or the flexible holder to the machine tool. The flexible holder assembly of the present invention includes a base for attaching to the machine tool, a flexible holder connected to the holder base and one or more flexible elements that permit the flexible holder to move relative the holder base. The machine tool may be clamped or otherwise connected to the flexible holder. As such, by altering one or more of flexible elements, the natural frequency of the flexible holder may be adjusted. For example, making the flexible element longer and/or making the flexible element thinner may be used to decrease the stiffness. Alternatively, a stiffer material may be used to increase the stiffness. Accordingly, the stiffness of the flexible elements may be adjusted using one or more factors including, but not limited to, increasing or decreasing the length of the flexible element, increasing or decreasing the thickness of the flexible element, altering the shape of the flexible element, changing the composition or compositions used to make the flexible element, or a combination thereof. Any one or all of these factors may be used to adjust the overall stiffness of the flexible elements and, therefore, the natural frequency of the flexible holder. The flexible elements may be made from any material capable of being used as a flexible element in the present invention including, but not limited to, carbon-fiber materials; ceramic materials; metals; metal composites, such as carbides; rubbers; plastics and the like. In addition, the flexible elements may take any shape provided the elements are capable of connecting the flexible holder to the base and/or the flexible holder to the machine tool including, but not limited to, cylindrical tubes or rods, square tubes or rods, rectangular tubes or rods, or the like.

Figure 2:
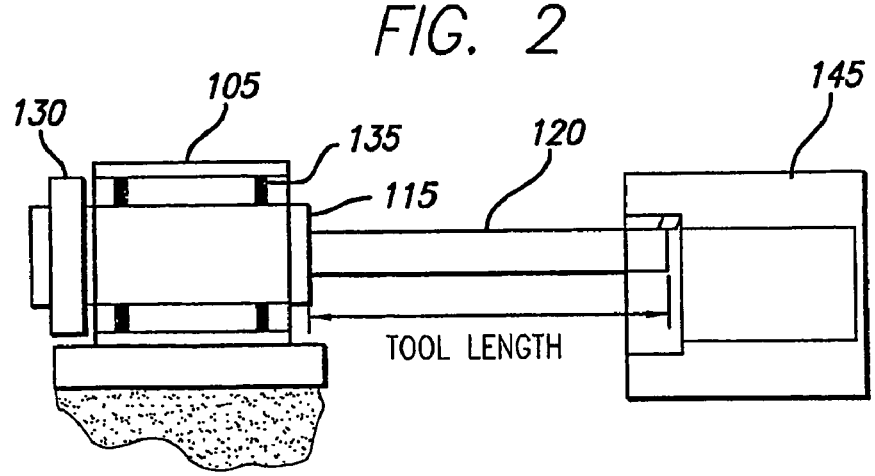
FIG. 2 provides a side view of the system of the present invention for one embodiment.

In an alternative embodiment of the present invention, it is possible to change the mass of the holder. This may be accomplished by the addition of mass to the holder (see FIG. 2) to realize the selected change in natural frequency. The mass additions may be selected during the holder design and could, in one embodiment, correspond to a finite number of tool lengths, for example. In one embodiment, the system may be designed such that the holder is capable of accommodating machine tools of different sizes and/or lengths. For example, in an embodiment wherein the tool is a boring bar, as the boring bar length increases, the clamped natural frequency decreases. As such, the present invention may include means for changing the natural frequency of the flexible holder to account for changes in the size of the tool. In one embodiment, the means for changing the natural frequency of the flexible holder is a plurality of weights, wherein changing the weight changes the natural frequency of the flexible holder when the machine tool is in use.

It is to be understood that while the present invention refers to a flexible holder for holding the machine tool, with the flexible holder having a natural frequency that matches or is substantially similar to the natural frequency of the machine tool, the concepts of the present invention may be used with any other structure capable of achieving the function of permitting at least some of the vibration energy from the tool to be dissipated without reflecting back to the machine tool. Accordingly, for the present invention, the system may include a base to attach to the machine and some device for holding the tool. Any mechanism capable of achieving relative motion between the tool holder and the base with the desired stiffness (and damping) characteristics may be used.

Reference is now made with specific detail to the drawings in which like reference numerals designate like or equivalent elements throughout the several views, and initially to FIGS. 1-4.

Figure 1A:
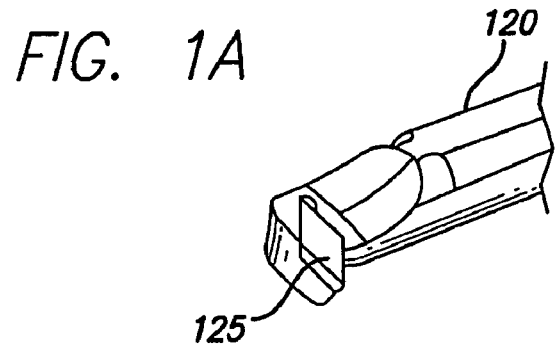
FIG. 1A provides an enlarged view of the tip of the machine tool set forth in FIG. 1.

FIGS. 1 and 1A depict one embodiment of a flexible holder system of the present invention. The flexible holder system 100 includes a holder base 105 that is designed to be connected to the selected machine tool 110. The shape and/or configuration of the base 105 may vary depending on the type of machine tool 110 with which the flexible holder assembly is being used, as well as the workpiece 145. As such, the base 105 is constructed and arranged to be able to be connected to a machine tool 110, while also being able to have the flexible holder 115 attached thereto. The base may be made from any material capable of holding a flexible holder and being used in a machine tool system including, but not limited to, metals, rubbers, plastics and the like.

The flexible holder 115 is the portion of the system 100 that attaches to the base 105 and secures the machine tool, which, for this embodiment, is a boring bar 120 having a cutting edge 125. The boring bar 120 is clamped or otherwise secured to the flexible holder 115. The flexible holder 115 is constructed and arranged to be able to move relative to the rest of the base 105. The movement of the flexible holder 115 relative to the base 105 is based, at least in part, on the natural frequency of this flexible holder 115 as matched to a particular boring bar 120 length. This matching may be accomplished using means for changing the natural frequency of the flexible holder 115. The flexible holder 115 may be constructed from any material capable of holding a machine tool while the machine tool is in use including, but not limited to, metals, ceramics, metal composites, carbon-fiber materials and the like.

In general, the natural frequency of the flexible holder 115 will decrease as the weight of the flexible holder 115 increases since the increased weight is harder to move, and therefore, vibrates more slowly. As such, in one embodiment, the means (see FIG. 2) for changing the natural frequency of the flexible holder 115 may include the use of a weight 130 that may be connected to the flexible holder 115. By increasing the weight added, the natural frequency decreases since, as described, the flexible holder and weight become more difficult to move and, therefore, vibrate more slowly when in use. In an alternative embodiment, the system 100 may be constructed and arranged such that the flexible holder 115 may be detachably connected to the base 105 such that different flexible holders may be used, with each flexible holder having a different weight. As such, if a flexible holder having a lower natural frequency is needed, the flexible holder may be changed to one having a higher weight. Conversely, if a flexible holder having a higher natural frequency is needed, the flexible holder may be changed to one having a lower weight.

The flexible holder 115 may be attached to the base 105 using any known means for connecting that also permit movement of the flexible holder 115 relative to the base 105. The flexible holder 115 may be constructed and arranged to freely move in a 360 degree movement relative to the base 105. In an alternative embodiment, the flexible holder 115 may also move in a transverse direction perpendicular to the plane of the base 105. In one embodiment, the flexible holder 115 may be connected to the base 105 using one or more flexible elements 135. These flexible elements 135 may permit movement in a 360 degree plane parallel to the plane of the base 105, movement in a transverse direction perpendicular to the plane of the base 105, or both.

Figure 3:
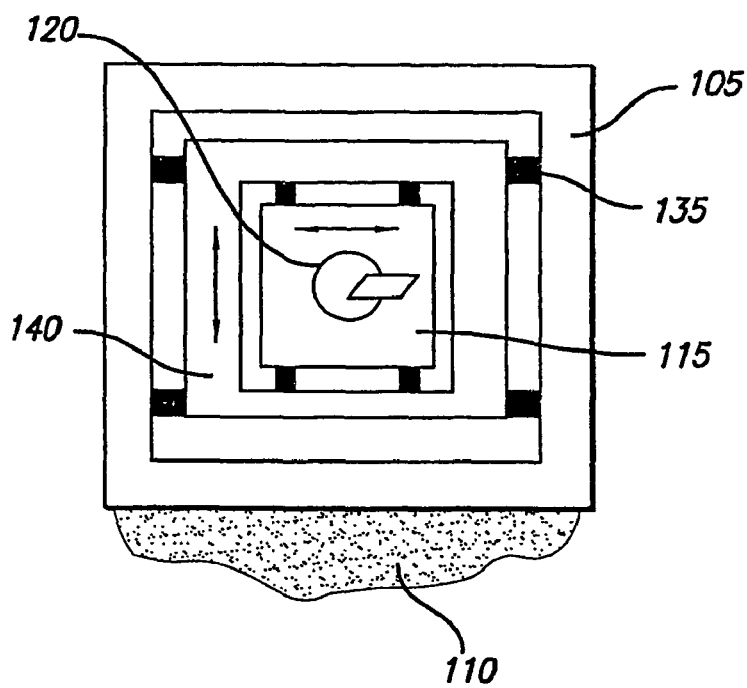
FIG. 3 provides an end view of the system of the present invention for one embodiment.

As seen more specifically in FIG. 3, in one embodiment, the flexible elements 135 may be used to connect the flexible holder 115 to the holder base 105. In this embodiment, two sets of flexible elements 135 are used, as well as an intermediate holder 140. The intermediate holder 140 and flexible elements 135 may be used to provide flexibility along one axis, such as along the x-axis as shown in FIG. 3, whereas the flexible elements 135 and flexible holder 115 may be used to provide flexibility along another axis, such as along the y-axis as shown in FIG. 3. However, it is to be understood that, in some embodiments, no intermediate holder 140 is used and alternate designs for realizing the flexibility are applied (for example, various flexure configurations). It is also to be understood that the flexible element 135 embodiment shown in FIG. 3 is for description purposes only. It is not necessary that the flexible elements 135 be stacked in series. The two-direction flexibility may also be achieved in parallel. In either case, the natural frequency in the two directions may be selected to match the tool natural frequency.

Figure 4:
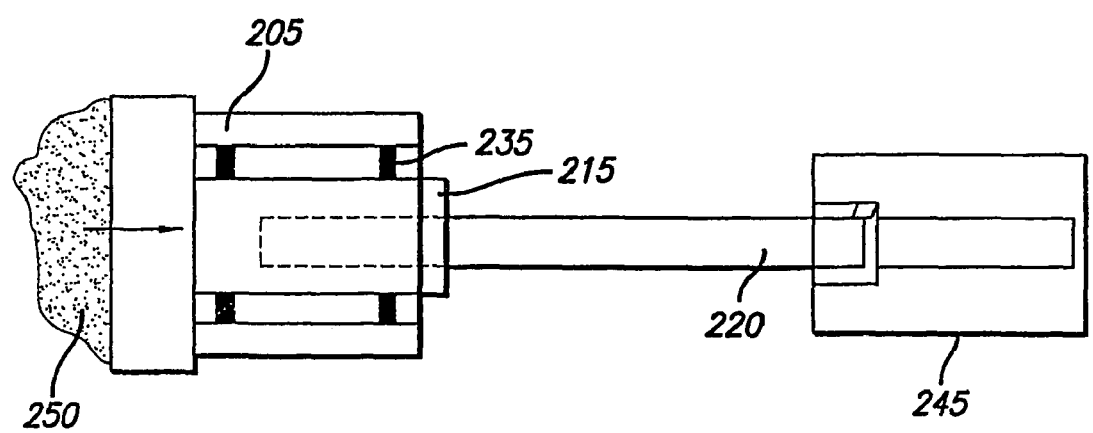
FIG. 4 provides a side view of the system of the present invention for an alternative embodiment.

FIG. 4 provides an alternative embodiment wherein the workpiece 245 is held stationary and the machine tool 220 is rotated in a spindle 250. The flexible holder 215 may be connected to the holder base 205 using one or more flexible elements 235. As with FIGS. 1-3, the same concepts may be used for adjusting the natural frequency of the flexible holder 215.

In an alternative embodiment, the flexible holder of the present invention may be used as part of a complete package or kit for use of the tool that may be used with any number of currently existing tools. For example, in an embodiment wherein the tool is a boring bar, the kit may include a base (designed for a single boring bar diameter) and a set of calibration weights that correspond to different boring bar lengths. These weights may be added to the kit to enable the dynamic absorber effect for a range of boring bar lengths within a single comprehensive kit. In use, the user would set the boring bar to the selected length, select the appropriate calibration weight, attach it to the holder using a convenient connection, and then begin machining. The kit may be designed such that the user would require no knowledge of vibrations theory or the operation of dynamic absorbers to be used. As such, the kit may be designed such that no adjustment is necessary once the item was purchased. In an alternative embodiment, the kit may also include a boring bar or other tool with which the flexible holder system may be used.

The present invention may be used with a variety of different a machine tool arrangements. It should be understood that the present invention may be applied to any situation in which external forces act upon a cantilevered member thereby exciting the member near its natural frequency and thereby causing excessive and non-beneficial amplitudes at the free end of the member. Such examples may include, but are not limited to, a boring bar in which vibration is caused by the oscillating interaction forces between a cutting element mounted at the free end of the bar and a workpiece, a horizontal or vertical turning lathe in which vibration is caused by the oscillating interaction forces between a cutting element mounted at the free end of the lathe ram and a workpiece, and a horizontal or vertical milling machine in which vibration is caused by the oscillating interaction forces between a cutting element mounted at the free end of the mill ram and a workpiece. Other potential uses for the holder of the present invention include hand tools and chain saws or other manual or automatic cutting operations where excessive vibrations should be avoided.

The present invention will now be further described through examples. It is to be understood that these examples are non-limiting and are presented to provide a better understanding of various embodiments of the present invention.

EXAMPLES

Example 1

In this example, the flexible direction for the holder was in the vertical direction only in order to demonstrate the concept using a simple model.

The tool used in this example had a diameter of 15.9 mm with an overhang length (i.e., length protruding from the holder) of six times its diameter or 95.4 mm. The tool material was assumed to be steel with an elastic modulus of $2 \times 10^{11}$ N/m$^2$, density of 7800 kg/m$^3$, and a structural damping factor of 0.0015. Calculations were completed using Euler-Bernoulli beam theory to determine the first mode dynamics of this tool if it were connected directly to a rigid base in a clamped-free condition (i.e., the flexible holder was not used). The resulting natural frequency was calculated to be 1240 Hz. The associated stiffness and viscous damping ratio values were $2.2 \times 10^6$ N/m and 0.0008, respectively.

Figure 5:
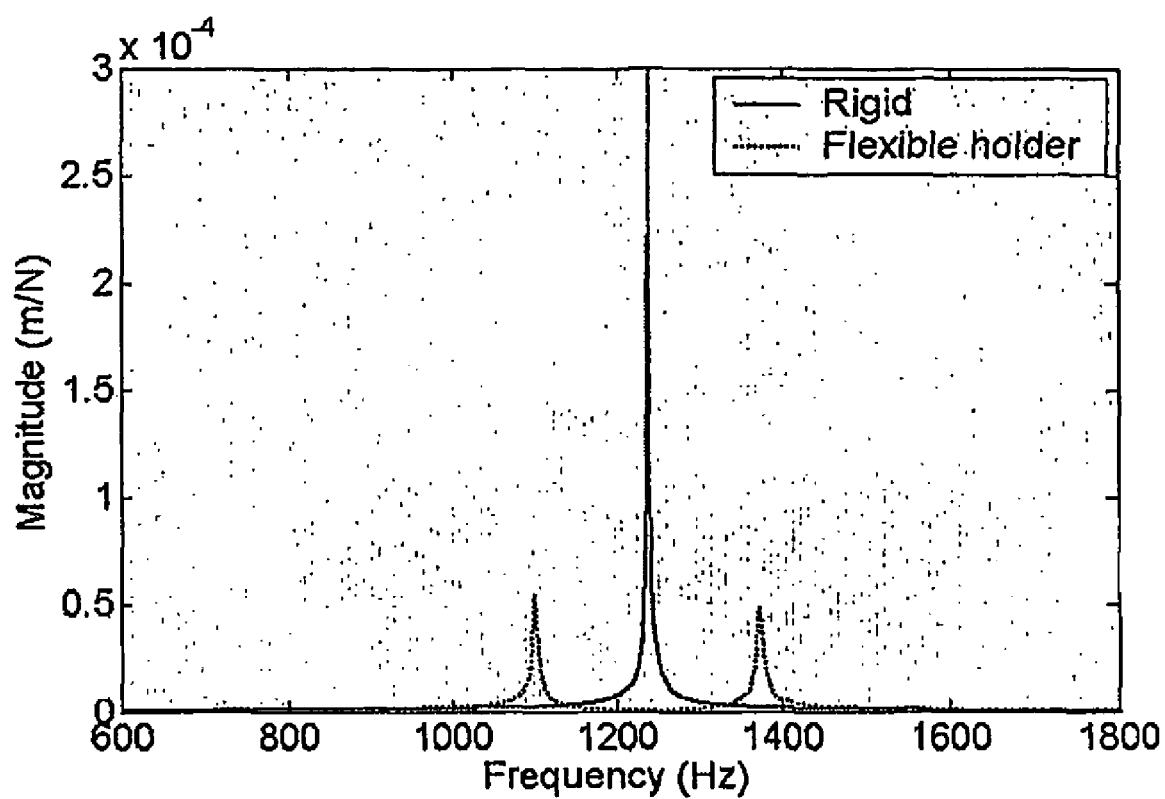
FIG. 5 provides a comparison of frequency response amplitude when using a prior art rigid base (solid line) and a flexible holder according to one embodiment of the present invention (dotted line).

Next, the flexible holder was defined to have the same natural frequency with 50 times the clamped-free tool's stiffness and 5 times the damping. The stiffness value was achieved by design, while the increased damping was realized by adding a foam filler in the cavity between the holder and holder base. A comparison of the magnitude of the vertical displacement-to-force frequency response at the free end of the tool for the clamped-free (rigid base) and flexible base conditions is shown in FIG. 5. It is seen that the use of the flexible base leads to a two mode system with six times the dynamic stiffness (i.e., the ratio of the peak values). This increased stiffness would enable significantly higher cutting depths with out chatter.

It is to be understood that while the invention has been described in conjunction with the specific embodiments thereof, that the foregoing description are intended to illustrate and not limit the scope of the invention. Other aspects, advantages and modifications within the scope of the invention will be apparent to those skilled in the art to which the invention pertains. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of."

We claim:

1. An apparatus for reducing vibrations in a machine tool comprising:
   a base; and
   a flexible holder connected to the base and adapted for being connected to a machine tool, wherein the flexible holder (a) is connected to the base such that the flexible holder is adapted for moving relative to the base in a transverse direction perpendicular to a plane of the base and (b) is connected to the base such that the movement of the flexible holder relative to the base occurs at a natural frequency.

2. The apparatus of claim 1, wherein the natural frequency is adjusted by adjusting the stiffness of the flexible holder.

3. The apparatus of claim 1, wherein the natural frequency is adjusted by adding weight to or removing weight from the flexible holder.

4. The apparatus of claim 1, wherein (a) the flexible holder is connected to the base using one or more flexible elements and (b) the natural frequency of the flexible holder is adjusted by adjusting the stiffness of the one or more flexible elements.

5. The apparatus of claim 1, wherein the machine tool is selected from the group consisting of a boring bar, a lathe, a milling machine, a hand tool, and a chain saw.

6. The apparatus of claim 1, wherein the natural frequency of the movement of the flexible holder relative to the base is substantially similar to a natural frequency of the machine tool connected to the flexible holder when the machine tool is in use.

7. A method for reducing vibrations in a machine tool comprising:
   attaching a holder base to the machine tool;
   connecting a flexible holder to the holder base such that the flexible holder is adapted for moving relative to the holder base in a transverse direction perpendicular to a plane of the holder base;
   connecting the machine tool to the flexible holder; and
   selecting the flexible holder such that as the flexible holder moves relative to the holder base, this movement occurs at a natural frequency.

8. The method of claim 7, further comprising the step of adjusting the natural frequency of the flexible holder.

9. The method of claim 8, wherein the natural frequency of the flexible holder is adjusted by a step selected from the group consisting of adding weight to the flexible holder and removing weight from the flexible holder.

10. The method of claim 8, wherein the natural frequency of the flexible holder is adjusted by changing the flexible holder to a flexible holder having a different weight.

11. The method of claim 8, wherein (a) the flexible holder is connected to the holder base using one or more flexible elements (b) the step of adjusting the natural frequency of the flexible holder comprises adjusting the stiffness of the one or more flexible elements.

12. The method of claim 7, wherein the machine tool is selected from the group consisting of a boring bar, a lathe, a milling machine, a hand tool, and a chain saw.

13. The method of claim 7, wherein the natural frequency of the movement of the flexible holder relative to the base substantially matches a natural frequency of the machine tool connected to the flexible holder when the machine tool is in use.

14. A kit for reducing vibrations in a machine tool comprising:
   a holder base adapted for being connected to a machine tool;
   a flexible holder connected to the holder base and adapted for being connected to the machine tool, wherein (a) the flexible holder is connected to the holder base such that the flexible holder is adapted for moving relative to the holder base in a transverse direction perpendicular to a plane of the holder base and (b) the natural frequency is adjusted by (i) adjusting the stiffness of the flexible holder or (i) adding weight to or removing weight from the flexible holder.

15. The kit of claim 14, further comprising a machine tool.

16. The kit of claim 15, wherein the machine tool is selected from the group consisting of a boring bar, a lathe, a milling machine, a hand tool, and a chain saw.

17. The kit of claim 14, wherein the natural frequency is adjusted by adjusting the stiffness of the flexible holder.

18. The kit of claim 14, wherein the natural frequency is adjusted by adding weight to or removing weight from the flexible holder.

19. An apparatus for reducing vibrations in a machine tool comprising:
   a base; and
   a flexible holder connected to the base and adapted for being connected to a machine tool, wherein the flexible holder (a) is connected to the base using one or more flexible elements, (b) is connected to the base such that the flexible holder is adapted for moving relative to the base in a 360 degree plane parallel to a plane of the base, (c) is connected to the base such that the movement of the flexible holder relative to the base occurs at a natural frequency, and (d) the natural frequency of the flexible holder is adjusted by adjusting the stiffness of the one or more flexible elements.

20. The apparatus of claim 19, wherein the natural frequency is adjusted by adding weight to or removing weight from the flexible holder.

21. The apparatus of claim 19, wherein the machine tool is selected from the group consisting of a boring bar, a lathe, a milling machine, a hand tool, and a chain saw.

22. The apparatus of claim 19, wherein the natural frequency of the movement of the flexible holder relative to the base is substantially similar to a natural frequency of the machine tool connected to the flexible holder when the machine tool is in use.

23. A method for reducing vibrations in a machine tool comprising:

attaching a holder base to the machine tool;

connecting a flexible holder to the holder base using one or more flexible elements such that the flexible holder is adapted for moving relative to the holder base;

connecting the machine tool to the flexible holder;

selecting the flexible holder such that as the flexible holder moves relative to the holder base, this movement occurs at a natural frequency; and adjusting the natural frequency of the flexible holder, wherein adjusting the natural frequency of the flexible holder comprises adjusting the stiffness of the one or more flexible elements.

24. The method of claim 23, wherein the machine tool is selected from the group consisting of a boring bar, a lathe, a milling machine, a hand tool, and a chain saw.

25. The method of claim 23, wherein the natural frequency of the movement of the flexible holder relative to the base substantially matches a natural frequency of the machine tool connected to the flexible holder when the machine tool is in use.

* * * * *